Sept. 12, 1933.  J. W. BRYCE  1,926,890
TABULATING MACHINE
Filed Feb. 16, 1928
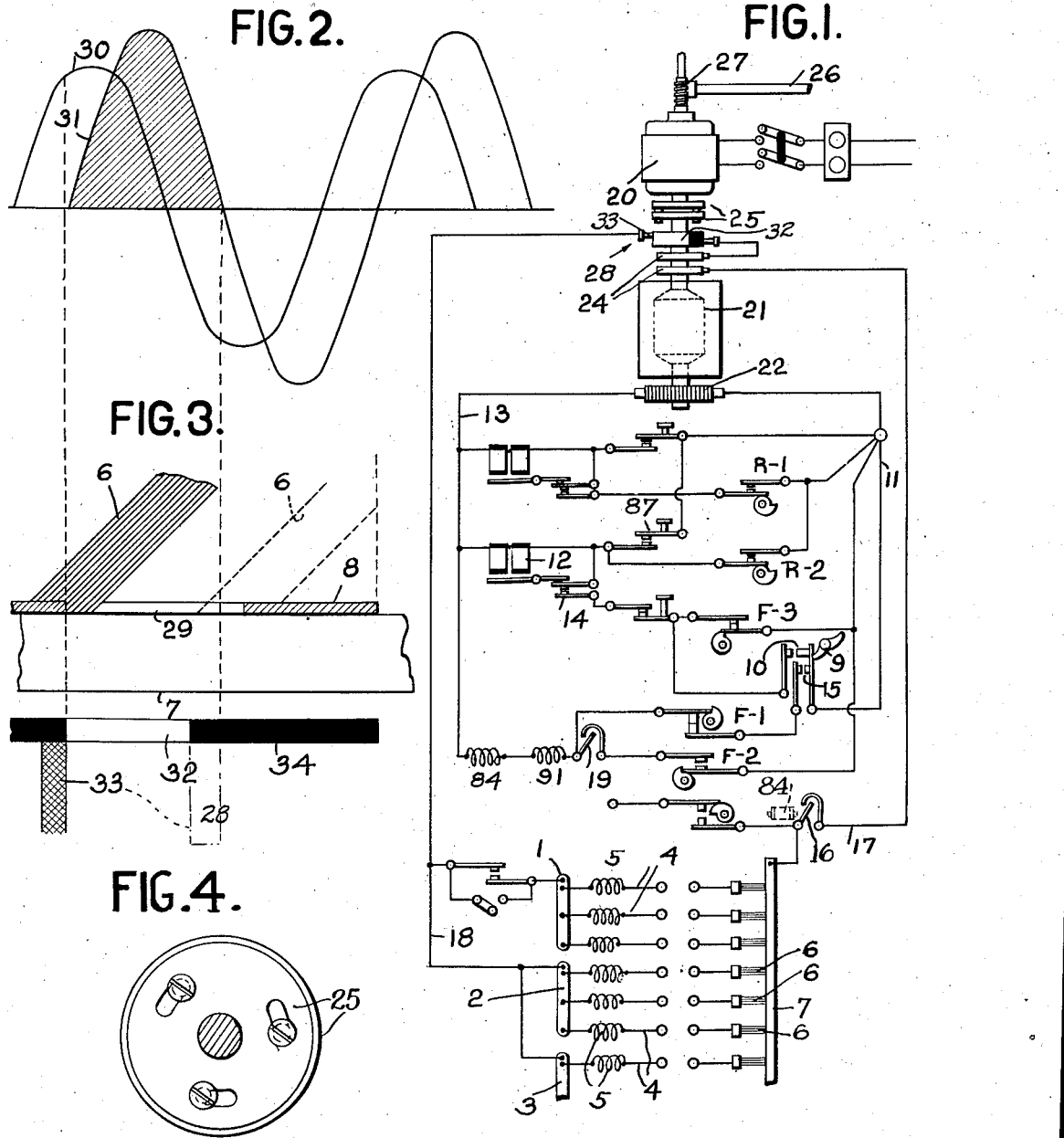
Inventor
James W. Bryce
By his Attorney
W. M. Wilson Patented Sept. 12, 1933

1,926,890

UNITED STATES PATENT OFFICE 1,926,890

TABULATING MACHINE

James W. Bryce, Bloomfield, N. J., assignor, by mesne assignments, to International Business Machines Corporation, New York, N. Y., a corporation of New York Application February 16, 1928. Serial No. 254,796

1 Claim. (Cl. 235—92)

The present invention concerns tabulating, sorting or analogous machines and is directed primarily to the production of a universal machine which may be operated by either an alternating or direct current power supply.

At the present time tabulating machines which are intended to be operated by a direct current are usually provided with motors suitable for operations by a direct current, the latter also being utilized for the brush circuits, control relays, etc. When such machines are intended to be operated by an alternating current a separate direct current is required. The generating equipment ordinarily comprises an induction motor or an A. C. motor of the self starting type coupled to a D. C. generator, the latter generating the direct current necessary for the brush circuits, relays, etc. and for the motors of the different machines. The system just described has inherent disadvantages particularly in instances where it is attempted to feed additional machines by a generator having a capacity sufficient only for the initial installation. The starting of the machines will in this case cause a drop in voltage, and since the relays ordinarily employed are sensitive to voltage changes it has frequently happened that the counter relays of the machines in operation would fail to function causing irregular and improper operations.

Moreover where direct current is used for energizing the counter magnet relays it is desirable that the time constants of the circuits be of such value as to afford the desired speed capabilities of the machines but since the circuits considered are usually highly inductive the small time constant required brings into consideration the extra or transient current. In the case under consideration the destructive effects upon insulation, etc. due to the high induced voltages upon interrupting the circuits is of practical importance.

It is, therefore, the main object of the present invention to provide for the operation of tabulating machines or the like irrespective of the type of driving or electric power supply available.

It is a further object of the present invention to provide for the operation of tabulating machines or the like by either an alternating or direct current without the use of auxiliary generating equipment such as D. C. generators in combination with prime movers.

It is a further object of the present invention to furnish direct current for use in the holding circuits and alternating current for the brush and counter relay circuits irrespective of the kind of electric power supply available.

In connection with brush and counter relay circuit current supply it is a further object to dispense with the controlling relays in the counter circuits; as well as the resistances in series therewith, fuses, and more or less complicated wiring, and if the machine be of the relayless type to dispense with the contacts in series with the counter magnets. The two major advantages that accrue as a result of being able to dispense with extra contacts, resistances, fuses, additional wiring, etc. is the decreased cost of manufacture of such machines and freedom from maintenance, such as cleaning and renewing of contacts, replacements of units, etc.

It is a further object of the present invention to synchronize the card feeding devices with the alternating current generator so that the various circuits will be made or broken at the proper points in the wave cycle to thereby eliminate the usual and destructive sparking at the brush contacts.

It is a still further object of the invention to determine the points on the wave form at which the make and break will occur irrespective of the fact that a brush has closed the circuit through a perforation in a controlling card, thus allowing liberal adjustments of the analyzing brushes.

The improvements are illustrated in detail in the accompanying drawing, in which:

Fig. 1 is a diagram of the circuit connections and an illdstration of the relations of several parts of the apparatus.

Fig. 2 illustrates the relationship between the voltage and current sine-waves required to effect a sparkless condition at the make and break of the circuits.

Fig. 3 is a diagrammatic view showing the relation between the card brushes and the auxiliary commutator preferably provided to eliminate or establish minimum sparking conditions.

Fig. 4 is a detail of the adjustable coupling provided to secure synchronization.

The present improvements may be embodied in any form of tabulating or sorting machine but in order to more fully comprehend the same they are shown in connection with the well known Hollerith tabulating machine but such showing should be considered as illustrative rather than restrictive and the present explanation of the machine will be limited to what is necessary for an understanding of the present invention.

The machine illustrated is assumed to comprise a series of counters 1, 2, and 3, each containing a plurality of counter magnet circuits 4, and which circuits each contain a magnet 5 and a brush 6. The brushes 6 bear against a contact plate or block 7 or the brushes may bear against individual contacts carried by the plate and in the operation of the machine perforated cards 8 are passed between the brushes 6 and said plate 7, or the contacts, with the result that whenever a brush comes over a perforation in a card it touches the contact plate and directs a current through the counter magnet connected with that brush.

When a card is passed by the action of the machine into the card chute it is supposed to engage with a pivoted lever 9 and by turning that lever it closes two contacts 10 and keeps them closed as long as a card remains in the chute. Initiation of the machine to cause feeding of cards is controlled by starting key 87 which when closed permits current to flow from one side of the D. C. line 11 through the card feed clutch relay magnet 12 to the other side of the line 13. Contacts 14 closed by energization of relay 12 connect one side of the clutch magnet 12 to the line 11 either through the card lever contacts 10 or card feed contacts F—3. If contacts 10 are opened (due to the fact that there are no cards in the chute) when card feed contacts F—3 open clutch magnet 12 will become de-energized and the card feeding mechanism will thereupon be stopped in its operation.

As card lever contacts 10 close, a pair of simultaneously operated contacts 15 will also close to cause current to flow from the D. C. line 11 through card feed contacts F—1 (closed) and through relay magnets 84 and 91. The former attracts its armature to cause contacts 16 to close permitting the A. C. side of the line 17 to be connected to plate 7. It will also be seen that the series of counter magnets 5 are connected to the other side of the A. C. line 18. Energization of relay 91 closes contacts 19 to connect relays 84 and 91 to the line side 11 through card feed contacts F—2 which close when card feed contacts F—1 open. If contacts 15 are opened (due to the absence of cards in the chute) when contacts F—2 open, relays 84 and 91 will become de-energized. Contacts 16 thereupon open to disconnect the A. C. line side 17 from the plate 7.

There are other parts illustrated, but the system is well known in the art, and such parts, as well as some of those above described, are not essential and need not all be used in carrying out the present improvements. Arranged exteriorly of or at any convenient point within the machine proper is a prime mover such as that indicated by numeral 20. The character of the prime mover is dependent upon the power supply available and may comprise, for example, either an induction motor or a direct current motor depending upon the kind of electrical power on hand. The motor 20 preferably drives a generator one section comprising a rotatable armature coil 21 and a commutator 22 for furnishing direct current to the line wires 11 and 13. Alternating current for the line wires 17 and 18 is preferably generated by the same armature 21 and a pair of collector rings 24, suitable taps being taken from the armature coil 21 for the D. C. and A. C. sections. The rotor of the prime mover 20 drives the armature coils through an adjustable coupling 25, (see Fig. 4) the other end of the rotor shaft of motor 20 driving the card feed clutch 26 by a worm drive 27. In series with one of the collector rings 24 and the A. C. side of the line 18 is a special commutator 28 which will be described more in detail hereinafter.

Fig. 2 illustrates the sine waves of the component A. C. voltage and current in which it will be apparent that the current lags behind the voltage due to the inductance of counter magnets 5, etc. The relation between Figs. 2 and 3 will best be understood by assuming that the brush 6 moves relatively to the card 8. By synchronizing card feed operations effected by shaft 26 and the alternator by the adjustable coupling 25, the brushes 6 may encounter the perforations in the card at points on the waves that will bring about sparkless operation. If the proper synchronization is effected by a relative angular displacement of the elements of the coupling 25, and if the brushes 6 are properly adjusted, the latter will encounter a perforation 29 to contact plate 7 at a point on the voltage curve 30 where the current wave 31 would have a permanent value of zero. This particular cyclic relation will bring about a sparkless condition and is supported both by theoretical deductions and actual practice. The current will then rise to its maximum value and if the brushes 6 leave the perforations 29 at a point where the current is again zero no sparking will occur at the break. It is, of course, obvious that to effect this operation the brushes 6 must be properly adjusted and that the card feed mechanism and alternator be properly synchronized. Since the make and break occur at points on the voltage curve where the current is zero the extra or transient current with its accompanying destructive effects due to the high voltages induced are avoided and any destructive sparking will be obviated.

It may happen in practice that it is difficult to keep the flexible wire brushes 6 adjusted so that the make and break occur accurately at the proper points in the cycle, and to insure the proper operation, the commutator 28 is provided and, as shown in Fig. 3, comprises a metal segment 32 coacting with a brush 33, and an insulating segment 34. Brush 33 and metal segment 32 may be in series with the A. C. circuit.

In Fig. 3, the brush 6 is shown in an improperly adjusted position and, as shown, would effect a "make" at a point where the current has a value which would introduce the extra or transient current and thus cause sparking. However, since the brush 33 has not yet contacted metal segment 32 no impulse will be transmitted to the counter magnet. At the time the current is practically zero, brush 33 will contact segment 32 but will subsequently leave the segment at a point when the current is again zero, or at points on the current curve a half cycle apart. This auxiliary device insures that each make and break will occur at the proper point and irrespective of the brush adjustments.

Attention is directed to the fact that another advantage secured by this arrangement is that the components of the machine such as relays, etc. are not as sensitive to voltage changes in the power supply as heretofore.

In exemplifying the present invention it has been assumed that a half wave is used for each card perforation but it is obvious that by establishing the proper speed relationship between the alternator and card feed controlling shaft, a complete wave or one and a half waves may be used with equally good results.

While I have shown and described and pointed out the fundamental novel features of the invention as applied to a single modification, it will be understood that various omissions and substitutions and changes in the form and details of the device illustrated and in its operation may be made by those skilled in the art without departing from the spirit of the invention. I intend to be limited therefore only as indicated by the scope of the following claim:

What is claimed is as follows:—

In a system of the class described, a prime mover, a generator adapted to be driven by the prime mover to generate both alternating and direct current, a series of control magnets each energized by said alternating current when a related analyzing brush encounters a perforation in one of a series of successively fed cards, a relay energized by the direct current when cards are fed and adapted to control the supply of alterating current for the control magnets, and means for synchronizing card feed with the alternating currrent.

JAMES W. BRYCE.